(12) United States Patent
Aida et al.

(10) Patent No.: US 12,722,527 B2
(45) Date of Patent: Sep. 1, 2026

(54) POWER SUPPLY SYSTEM AND METHOD FOR CONTROLLING POWER SUPPLY SYSTEM

(71) Applicant: GS Yuasa International Ltd., Kyoto (JP)

(72) Inventors: Hironori Aida, Kyoto (JP); Seiji Takai, Kyoto (JP); Koichi Nishiyama, Kyoto (JP); Ryoichi Okuyama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 39 days.

(21) Appl. No.: 18/719,072

(22) PCT Filed: Dec. 6, 2022

(86) PCT No.: PCT/JP2022/044841
§ 371 (c)(1),
(2) Date: Nov. 26, 2024

(87) PCT Pub. No.: WO2023/112766
PCT Pub. Date: Jun. 22, 2023

(65) Prior Publication Data

US 2025/0091479 A1 Mar. 20, 2025

(30) Foreign Application Priority Data

Dec. 15, 2021 (JP) ................................ 2021-203414

(51) Int. Cl.
*B60L 58/18* (2019.01)
*H02J 9/06* (2006.01)

(52) U.S. Cl.
CPC ................ *B60L 58/18* (2019.02); *H02J 9/06* (2013.01)

(58) Field of Classification Search
None
See application file for complete search history.

(56) References Cited

U.S. PATENT DOCUMENTS 11,001,162 B2 * 5/2021 Yamada .................. B60L 50/16
2005/0035740 A1 * 2/2005 Elder ................ H01M 10/0413 320/116

(Continued)

FOREIGN PATENT DOCUMENTS

JP H 06-255402 A 9/1994
JP H 08-214409 A 8/1996

(Continued)

OTHER PUBLICATIONS

International Search Report and Written Opinion for Patent Cooperation Treaty Application No. PCT/JP2022/044841, dated Feb. 7, 2023, 10 pages.

*Primary Examiner* — Regis J Betsch
*Assistant Examiner* — Joel Barnett
(74) *Attorney, Agent, or Firm* — Buchalter LLP

(57) ABSTRACT

A power supply system (1) included in a moving body (2) includes a main power supply (11) having a plurality of energy storage devices (10) and connected to a drive system (3) for moving the moving body (2). A first device group (21) including at least one energy storage device (10) among the plurality of energy storage devices (10) is a backup power supply configured to be connected to an auxiliary machine system (4) of the moving body (2).

3 Claims, 9 Drawing Sheets

(56) References Cited

U.S. PATENT DOCUMENTS

| | | | | |
|---|---|---|---|---|
| 2010/0065349 | A1 | 3/2010 | Ichikawa | |
| 2011/0251745 | A1* | 10/2011 | Yamamoto | B60W 10/06<br>180/65.265 |
| 2014/0015454 | A1* | 1/2014 | Kunimitsu | H01M 10/482<br>320/134 |
| 2016/0276855 | A1* | 9/2016 | Lian | H01M 50/249 |
| 2017/0232962 | A1 | 8/2017 | Yamauchi | |
| 2018/0201154 | A1* | 7/2018 | Omura | H01M 8/04671 |
| 2020/0023794 | A1 | 1/2020 | Maekawa | |
| 2020/0079232 | A1* | 3/2020 | Erhart | B60L 58/22 |
| 2020/0290480 | A1* | 9/2020 | Tsubaki | B60L 58/21 |

FOREIGN PATENT DOCUMENTS

| | | | |
|---|---|---|---|
| JP | 2008-187884 | A | 8/2008 |
| JP | 2013-168253 | A | 8/2013 |
| JP | 2017-144881 | A | 8/2017 |
| JP | 2018-148733 | A | 9/2018 |
| JP | 2020-124060 | A | 8/2020 |
| JP | 2022-063238 | A | 4/2022 |
| WO | WO 2020/044938 | A1 | 3/2020 |

* cited by examiner

Moving body
ECU
Utility unit
Driving function unit
Sub-power supply
Power supply system
Control unit
Control device
Selector unit
DC/DC converter
First device group
Second device group
N-th device group
Main power supply
Motor
Drive wheel
9
8
7
4
12
17
15
14
16
161
161
161
13
30
30
30
11
6
3
5
2
1
20,21
20,22
20,2N Moving body
ECU
9
Utility unit
8
Driving function unit
7
4
Sub-power supply
12
17
Power supply system
Control unit
15
Control device
14
Selector unit
16
161
161
161
DC/DC converter
13
19
30
30
30
First device group
Second device group
N-th device group
Main power supply
11
20,21
20,22
20,2N
Motor
6
Drive wheel
5
3
2
1

POWER SUPPLY SYSTEM AND METHOD FOR CONTROLLING POWER SUPPLY SYSTEM

CROSS REFERENCE TO RELATED APPLICATIONS

This application is a National Stage Application, filed under 35 U.S.C. § 371, of International Application No. PCT/JP2022/044841, filed Dec. 6, 2022, which international application claims priority to and the benefit of Japanese Application No. 2021-203414, filed Dec. 15, 2021; the contents of both of which as are hereby incorporated by reference in their entireties.

BACKGROUND

Technical Field

The present invention relates to a power supply system mounted on a moving body and a control method therefor.

Description of Related Art

A moving body such as an automobile, for example, includes a high-voltage battery (main power supply) that supplies power to a drive system and an auxiliary battery (sub-power supply) that supplies power to an auxiliary machine system. Furthermore, the moving body is provided with a backup power supply (alternator) that supplies backup power to the auxiliary machine system when the auxiliary battery fails or with a DC/DC converter that performs voltage conversion from the drive system to the auxiliary machine system and supplies power (see, for example, Patent Document JP-A-2017-144881).

BRIEF SUMMARY

In the meantime, a moving body is always required to achieve weight reduction. Therefore, the power supply system mounted in the moving body is also required to achieve weight reduction and space saving.

An object of the present invention is to provide a power supply system capable of achieving weight reduction and space saving.

In order to achieve the above objects, a power supply system according to one aspect of the present invention is included in a moving body. The power supply system includes a main power supply that includes a plurality of energy storage devices and is connected to a drive system for moving the moving body. A first device group including at least one energy storage device, which is a part of the plurality of energy storage devices, is a backup power supply configured to be connected to an auxiliary machine system of the moving body.

In a control method for a power supply system according to another aspect of the present invention which is included in a moving body and in which a main power supply including a plurality of energy storage devices is connected to a drive system and a first device group including at least one of the energy storage devices is a backup power supply configured to be connected to an auxiliary machine system, when an abnormality has occurred in the supply of power from the main power supply, power is supplied from the backup power supply to at least one of the auxiliary machine system and the drive system.

According to the present invention, it is possible to reduce the weight and space of a power supply system.

DETAILED DESCRIPTION OF VARIOUS EMBODIMENTS

[Exemplary Findings]

Figure 1:
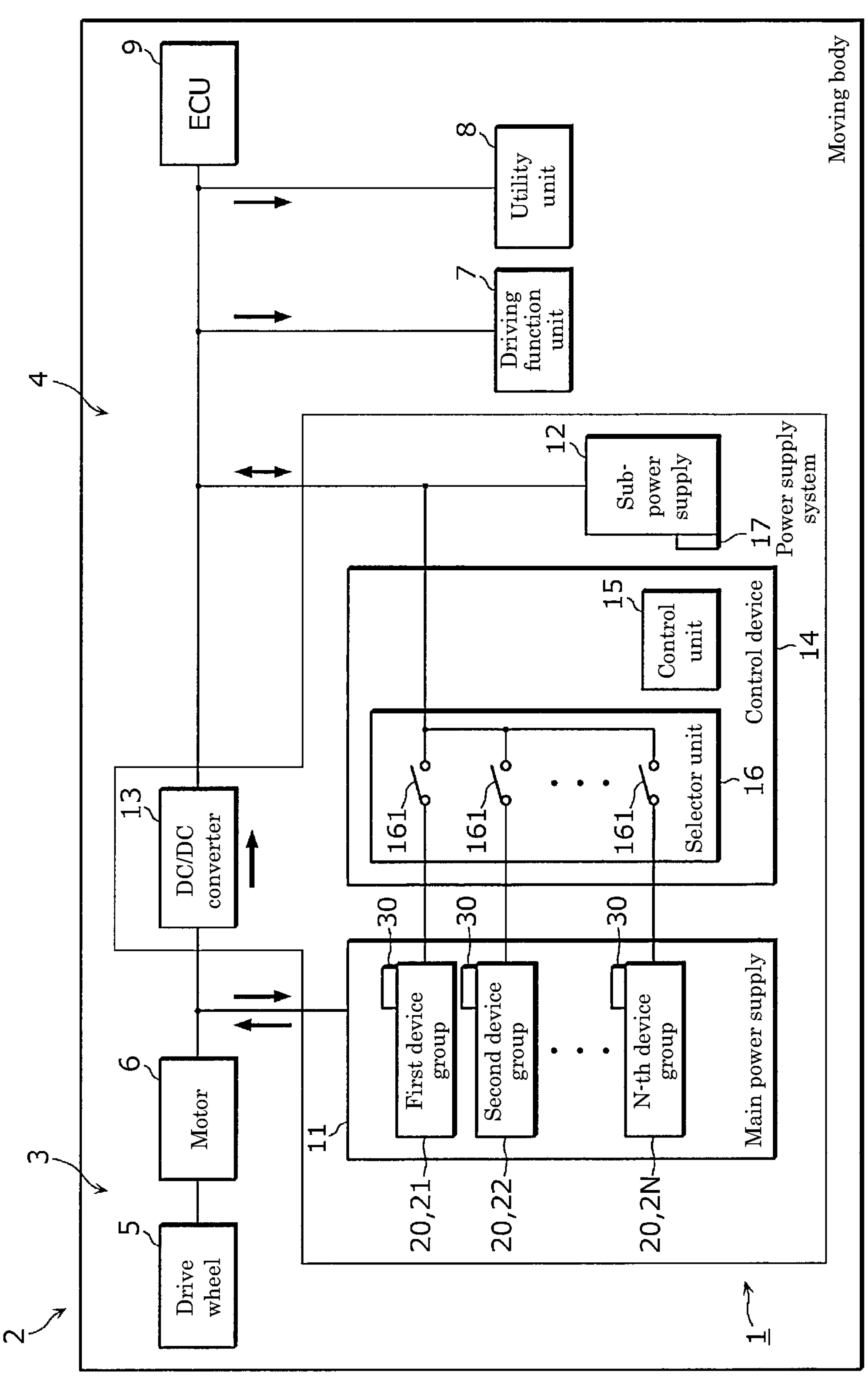
FIG. 1 is a block diagram illustrating the control configuration of a power supply system according to an embodiment.

In recent years, in an electric vehicle, in the event of failure of the main power supply (including a failure of the energy storage device included in the main power supply and a failure of a system or a wiring system of the main power supply) on a highway or the like, it is required to supply electric power from a sub-power supply to a drive system for several minutes to assist traveling of a moving body and to stop the moving body safely. For this reason, the sub-power supply may be required to have high power that is not used in normal applications. Such a demand for high power performance of the sub-power supply leads to an increase in the size and weight of the sub-power supply and also causes an increase in the price of the sub-power supply.

Furthermore, in the future, in a moving body using electricity as a main power source, it is assumed that the computer control (ECU) of a driving support system such as automatic driving progresses, and the state of the moving body is monitored by various sensors and the like. For this reason, it is extremely important to take measures against failure (backup handling) of the sub-power supply that supplies power to the auxiliary machine system including the computer and various sensors. The present invention has been made from such a viewpoint.

A power supply system according to one aspect of the present invention is a power supply system provided in a moving body. The power supply system includes a main power supply including a plurality of energy storage devices and connected to a drive system for moving the moving body. A first device group including at least one energy storage device which is a part of the plurality of energy storage devices a backup power supply configured to be connected to an auxiliary machine system of the moving body.

When the main power supply fails, not all of the plurality of energy storage devices provided in the main power supply fail, but only a few energy storage devices among the plurality of energy storage devices fail, or only a system and a wiring system related to the main power supply fail, and most energy storage devices remain normal. For this reason, the first device group including at least one energy storage device constituting a part of the plurality of energy storage devices included in the main power supply can be used as the backup power supply of the auxiliary machine system. That is, the first device group serves for both the supply of power to the drive system and the supply of power for backup. Therefore, it is not necessary to provide a power supply dedicated to backup of the auxiliary machine system. Furthermore, even when the main power supply fails, the drive system can be driven by the supply of power from the first device group as a backup power supply in addition to the supply of power from the sub-power supply. That is, it is not necessary to adopt a high-power sub-power supply, and it is possible to reduce the weight and size of the sub-power supply. For these reasons, it is possible to reduce the weight and space of the entire system.

A second device group including at least one energy storage device, among the plurality of energy storage devices, other than the energy storage devices included in the first device group may be a backup power supply configured to be connected to an auxiliary machine system of the moving body.

According to this, each of the first device group and the second device group is a backup power supply of the auxiliary machine system. For example, even if a failed energy storage device is included in the first device group, there is a high possibility that all the energy storage devices remain normal in the second device group. In this case, backup power can be supplied from the second device group to the auxiliary machine system. Therefore, the reliability of the backup power supply can be enhanced.

The power supply system may include a determination unit that determines to use one of the first device group and the second device group as a backup power supply based on the state of each of the first device group and the second device group.

According to this, since the determination unit determines the device group to be used based on the respective states of the first device group and the second device group, it is possible to select the device group suitable as the backup power supply at the present time. Therefore, the reliability of the backup power supply can be further improved.

The backup power supply may be connected to the drive system via the auxiliary machine system.

When the main power supply fails, the supply of power from the main power supply to the drive system may be interrupted. In this case, in the present aspect, power can be supplied from the backup power supply to the drive system via the auxiliary machine system. As a result, although the voltage is significantly lower than the voltage at the normal time, the drive system can be auxiliarily driven. For example, the moving body can be moved to a road shoulder that does not interfere with other moving bodies.

The power supply system may include a sub-power supply connected to the auxiliary machine system. When the backup power supply supplies power to the drive system, power may also be supplied from the sub-power supply to the drive system via the auxiliary machine system.

According to this, when the backup power supply supplies power to the drive system, power is also supplied from the sub-power supply to the drive system via the auxiliary machine system, so that stability when the drive system is auxiliarily driven can be enhanced.

Each of the plurality of energy storage devices may include two sets of a positive electrode terminal and a negative electrode terminal.

With such a configuration, each of the energy storage devices has two sets of positive electrode terminals and negative electrode terminals and hence, one set of the positive electrode terminal and the negative electrode terminal can be connected to the drive system and the other set of the positive electrode terminal and the negative electrode terminal can be connected to the auxiliary machine system whereby the circuit configuration can be simplified.

In a control method according to one aspect of the present invention, which is for a power supply system and is included in a moving body and in which a first device group including at least one of the energy storage devices of a main power supply including a plurality of energy storage devices and connected to a drive system is a backup power supply configured to be connected to an auxiliary machine system, when an abnormality has occurred in the main supply of power to at least one of the auxiliary machine system and the drive system, power is supplied from the backup power supply to the system, of the auxiliary machine system and the drive system, in which the abnormality has occurred.

When the main power supply fails, not all of the plurality of energy storage devices provided in the main power supply fail, but only a few energy storage devices among the plurality of energy storage devices fail, or only a system and a wiring system related to the main power supply fail, and most energy storage devices remain normal. For this reason, the first device group including at least one energy storage device constituting a part of the plurality of energy storage devices included in the main power supply can be used as the backup power supply. That is, the first device group serves for both the supply of power to the drive system and the supply of power for backup.

In a normal state, power is mainly supplied from the main power supply to the drive system, and power is mainly supplied from the sub-power supply to the auxiliary machine system. A case where an abnormality has occurred in the supply of power from the main power supply to the drive system and a case where an abnormality has occurred in the supply of power from the sub-power supply to the auxiliary machine system can be inclusively referred to as a case where an abnormality has occurred in the main supply of power to at least one of the auxiliary machine system and the drive system. In such a case, since power is supplied from the backup power supply to the abnormal system among the drive system and the auxiliary machine system, it is not necessary to provide a dedicated backup power supply. For this reason, it is possible to reduce the weight and space of the entire system.

When an abnormality has occurred in the supply of power from the main power supply, power may be supplied from the backup power supply to the drive system.

According to this, when an abnormality has occurred in the supply of power from the main power supply, power is supplied from the backup power supply to the drive system. Therefore, even when an abnormality has occurred in the main power supply, the drive system can be operated by power from the backup power supply.

The power supply system supplies power from the backup power supply to each of the auxiliary machine system and the drive system when an abnormality has occurred in the supply of power from each of the main power supply and the sub-power supply connected to the auxiliary machine system.

According to this, when an abnormality has occurred in the supply of power from each of the main power supply and the sub-power supply, power is supplied from the backup power supply to each of the auxiliary machine system and the drive system. Therefore, even when an abnormality has occurred in the main power supply and the sub-power supply, the auxiliary machine system and the drive system can be operated by power from the backup power supply.

Embodiment

A power supply system according to an embodiment of the present invention (including its modification example) will be described below with reference to the accompanying drawings. Note that the embodiment described below shows a comprehensive or specific example. Numerical values, shapes, materials, constituent devices, placement positions and connection modes of the constituent devices, manufacturing processes, the order of the manufacturing processes, and the like presented in the following embodiment are merely examples and are not intended to limit the present invention. In each drawing, dimensions and the like are not strictly shown. In the drawings, the same or similar constituent devices are denoted by the same reference numerals.

[Power Supply System]

FIG. 1 is a block diagram illustrating the control configuration of a power supply system 1 according to an embodiment. The arrows in FIG. 1 indicate the flows of power. As illustrated in FIG. 1, the power supply system 1 is a system that is mounted on a moving body 2 and supplies power to a drive system 3 and an auxiliary machine system 4 of the moving body 2.

In this case, the moving body 2 is, for example, an automobile, a motorcycle, a watercraft, a ship, a snowmobile, an agricultural machine, a construction machine, or a railway vehicle for an electric railway. An automobile is, for example, an electric vehicle (EV), a hybrid electric vehicle (HEV), or a plug-in hybrid electric vehicle (PHEV). In the present embodiment, an electric vehicle will be described as an example of the moving body 2.

The moving body 2 includes the drive system 3 and the auxiliary machine system 4. The drive system 3 is provided with a motor 6 for driving drive wheels 5, and the motor 6 is electrically connected to the power supply system 1. The auxiliary machine system 4 is provided with a driving function unit 7, a utility unit 8, and an electronic control unit (ECU) 9, and the driving function unit 7, the utility unit 8, and the ECU9 are electrically connected to the power supply system 1.

The driving function unit 7 is a part that implements the driving function of the moving body 2. Specifically, the driving function unit 7 includes an electric brake unit for operating the brake of the moving body 2 and a steering unit for operating the steering. When the moving body 2 has an automatic driving function, the driving function unit 7 includes an automatic driving unit that operates each mechanism that executes the automatic driving function. The driving function unit 7 may also include units for executing driving functions other than those exemplified here.

The utility unit 8 is a portion that operates for a purpose other than the drive and driving functions of the moving body 2. Specifically, the utility unit 8 includes a light, an air conditioner, a car navigation system, and the like. The utility unit 8 may also include a portion that operates for purposes other than those exemplified herein.

The ECU9 includes a central processing unit (CPU) and a memory (not illustrated), and the CPU executes predetermined arithmetic processing on the basis of information stored in the memory and controls each unit of the moving body 2 on the basis of an arithmetic result.

The power supply system 1 includes a main power supply 11, a sub-power supply 12, a DC/DC converter 13, and a control device 14. The main power supply 11 is electrically connected to the drive system 3. The main power supply 11 includes a plurality of device groups 20. For example, as illustrated in FIG. 1, each device group 20 includes a first device group 21, a second device groups 22, . . . , and an N-th device group 2N. Each device group 20 includes a plurality of energy storage devices 10 (see FIG. 2). The number of the plurality of energy storage devices 10 included in each device group 20 is the same. The details of the energy storage device 10 will be described later.

Each device group 20 is provided with a sensor 30 that detects the state of the device group 20. The sensor 30 is, for example, a voltage sensor that detects the overall voltage of the device group 20 or a temperature sensor that detects the temperature of at least one energy storage device 10 included in the device group 20. In a case where the sensor 30 is a voltage sensor, it can be determined that the device group 20 is abnormal when the overall voltage of the device group 20 to be detected is less than a predetermined value, and it can be determined that the device group 20 is normal when the overall voltage of the device group 20 is equal to or greater than the predetermined value. On the other hand, when the sensor 30 is a temperature sensor, it can be determined that the device group 20 is abnormal when at least one energy storage device 10 included in the device group 20 to be detected has a predetermined temperature or higher, and it can be determined that the device group 20 is normal when the device group 20 does not include the energy storage device 10 having a predetermined temperature or higher.

The sub-power supply 12 is electrically connected to the auxiliary machine system 4. The sub-power supply 12 is, for example, a lithium ion secondary battery or a lead secondary battery and is configured to be capable of charging electricity having a voltage capable of operating the driving function unit 7, the utility unit 8, and the ECU9 and discharging the electricity to the outside.

The DC/DC converter 13 is a converter electrically connected to the drive system 3 and the auxiliary machine system 4. The DC/DC converter 13 converts electricity into a voltage suitable for the auxiliary machine system 4 when supplying the electricity from the drive system 3 to the auxiliary machine system 4 and converts electricity into a voltage suitable for the drive system 3 when supplying the electricity from the auxiliary machine system 4 to the drive system 3.

The control device 14 includes a control unit 15 and a selector unit 16. The control unit 15 includes a CPU, a RAM, and a ROM and controls each unit by causing the CPU to develop a program stored in the ROM in the RAM and execute the program.

Specifically, each sensor 30 is electrically connected, and the control unit 15 determines whether each device group 20 is normal or abnormal based on the detection result obtained by each sensor 30. Upon determining that at least one device group 20 has an abnormality, the control unit 15 determines that stable supply of power from the main power supply 11 to the drive system 3 cannot be performed (first determination). An abnormality sensor 17 that detects an abnormality in the sub-power supply 12 is electrically connected to the control unit 15. When the abnormality sensor 17 detects an abnormality in the sub-power supply 12, the control unit 15 determines that stable supply of electrode from the sub-power supply 12 cannot be performed (second determination). The control unit 15 changes the control on the selector unit 16 based on the presence or absence of the first determination or the second determination.

The selector unit 16 includes a plurality of switch units 161 connected to each device group 20. The switch units 161 are electrically arranged in parallel and connected to the auxiliary machine system 4. Each switch unit 161 is opened and closed under the control of the control unit 15. A control method for the selector unit 16 by the control unit 15 will be described later. The energy storage device 10 in which the switch unit 161 is closed is electrically connected to the auxiliary machine system 4 and thus is used as a backup power supply of the auxiliary machine system 4.

[Energy Storage Device]

In the present invention, as described above, even when the safety stop of the electric vehicle on a highway or the like is intended, most of the required high power can be supplied from the main power supply 11. Therefore, the size and weight of the sub-power supply 12 can be reduced, and a reduction in cost can be achieved. Further, the energy storage devices 10 according to the present invention can be used even when each has a battery structure including one positive electrode terminal and one negative electrode terminal for each device. However, as illustrated below, it is possible to increase the degree of freedom of the configuration of the energy storage devices 10 when each has two positive electrode terminals 310 and two negative electrode terminals 320.

Figure 2:
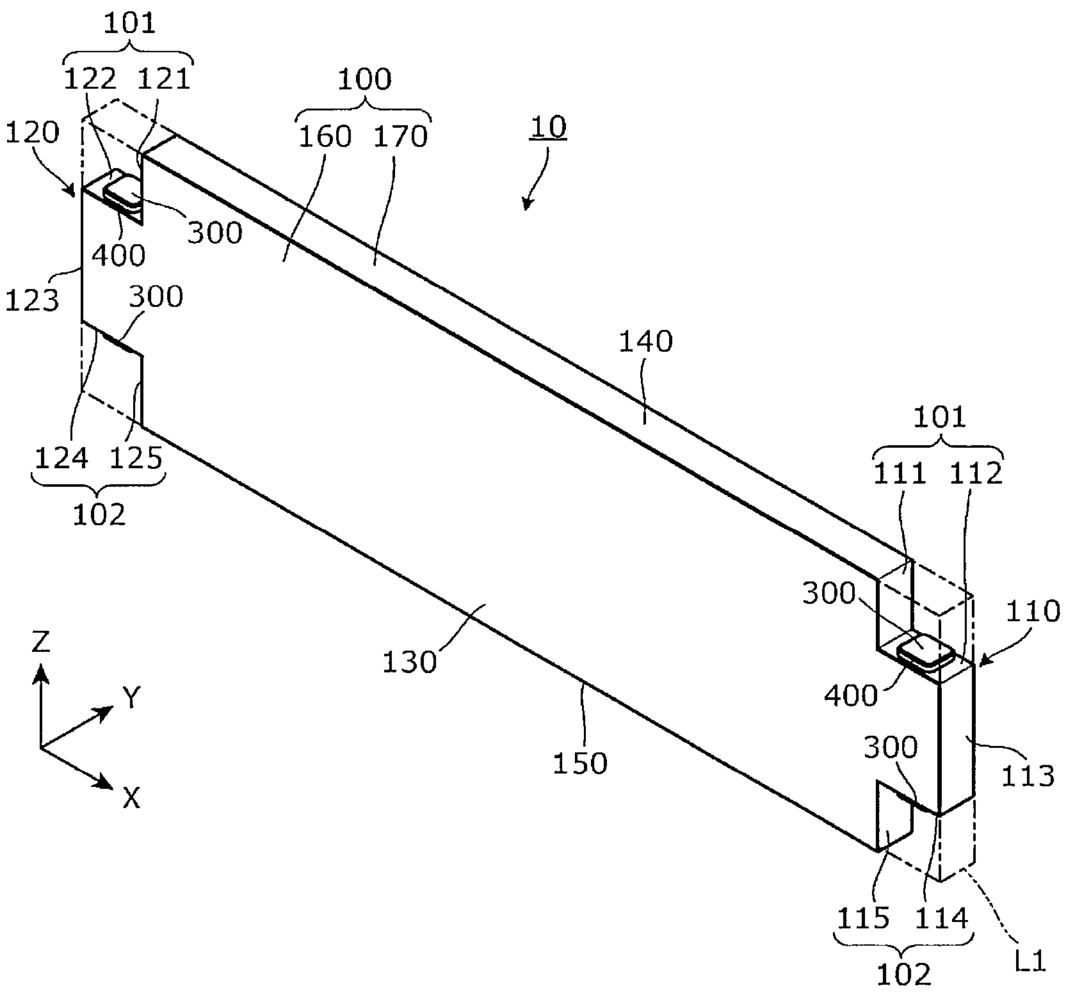
FIG. 2 is a perspective view showing an external appearance of an energy storage device according to the embodiment.
Figure 3:
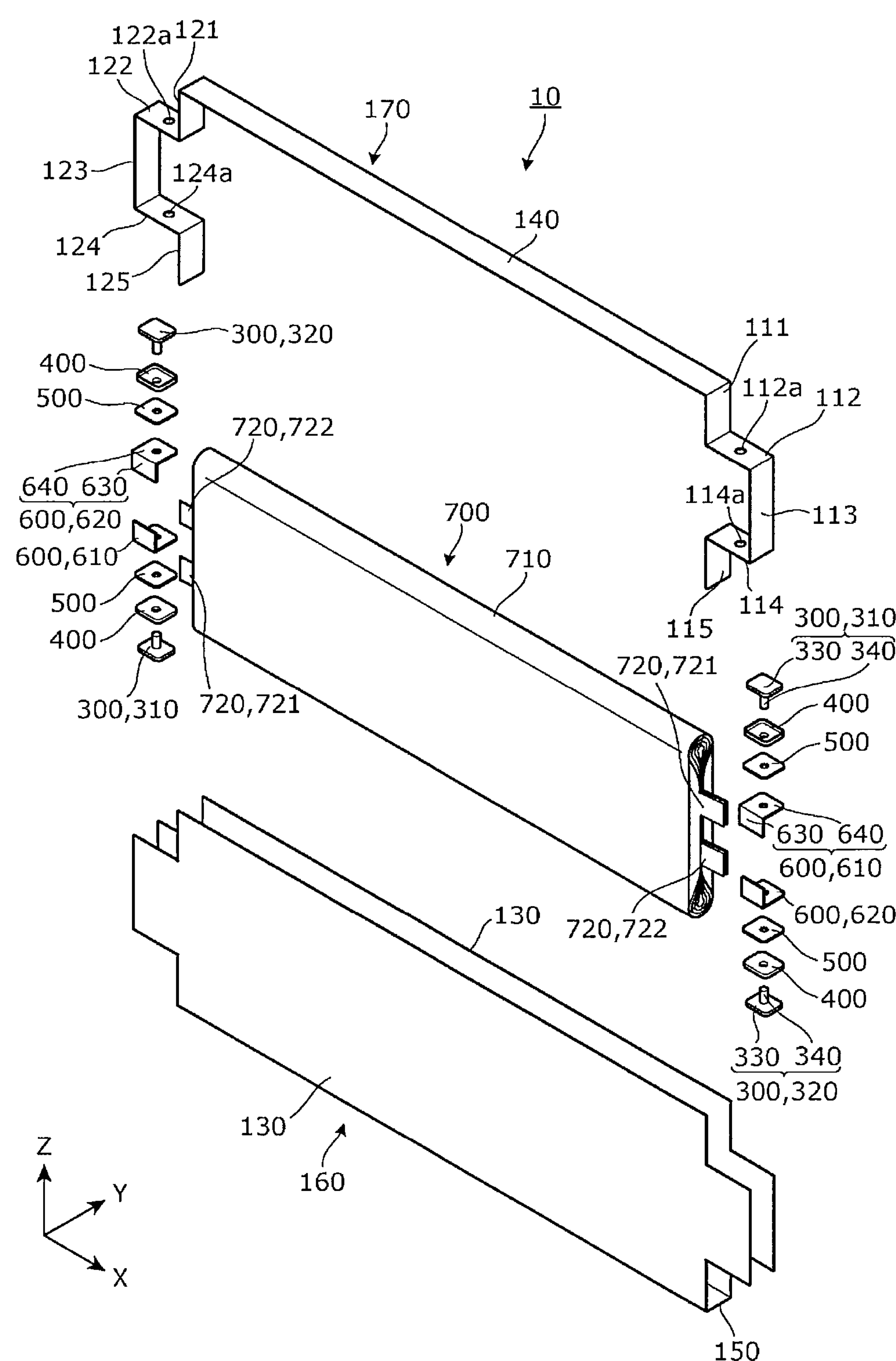
FIG. 3 is an exploded perspective view showing the respective constituent devices of the energy storage device according to the embodiment in an exploded state.

Next, with reference to FIGS. 2 and 3, an overall description of the energy storage device 10 according to this embodiment is made. FIG. 2 is a perspective view showing an external appearance of the energy storage device 10 according to this embodiment. FIG. 3 is an exploded perspective view showing the respective constituent devices of the energy storage device 10 according to the embodiment in an exploded state.

In the following description and drawings, a direction along the winding axis of an electrode assembly, an extending direction of the electrode assembly, or an opposing direction to the short side surfaces of the case is defined as an X-axis direction. An opposing direction to the long side surfaces of the case or the thickness direction of the case is defined as a Y-axis direction. A direction in which the bottom surface of the case main body of the case and the top surface of the lid body are aligned or the vertical direction is defined as a Z-axis direction. The X-axis direction is an example of a first direction, and the Z-axis direction is an example of a second direction. The X-axis direction, the Y-axis direction, and the Z-axis direction are directions intersecting (orthogonal in this embodiment) each other. Although the Z-axis direction may not be the vertical direction depending on a usage aspect, the Z-axis direction will be described below as the vertical direction for convenience of description.

In the following description, for example, an X-axis plus direction indicates the arrow direction of the X axis, and an X-axis minus direction indicates a direction opposite to the X-axis plus direction. The same applies to the Y-axis direction and the Z-axis direction. Furthermore, expressions indicating relative directions or postures, such as parallel and orthogonal, strictly include cases where the directions or postures are not the same. For example, two directions being orthogonal to each other not only means that the two directions are completely orthogonal to each other, but also means that the two directions are substantially orthogonal to each other, that is, the two directions include a difference of, for example, about several percent.

The energy storage device 10 is an energy storage device that can charge electricity from the outside and discharge electricity to the outside and has a substantially rectangular parallelepiped shape in the present embodiment. The energy storage device 10 is not limited to a nonaqueous electrolyte secondary battery and may be a secondary battery other than the nonaqueous electrolyte secondary battery. The energy storage device 10 may also be a battery using a solid electrolyte. In addition, the energy storage device 10 may be a pouch type energy storage device. In the present embodiment, the energy storage device 10 based on a flat rectangular parallelepiped shape (substantially rectangular parallelepiped shape) is illustrated, but the shape of the energy storage device 10, that is, the shape of a case 100 is not limited to a shape based on a rectangular parallelepiped shape and may be a shape based on a polygonal columnar shape other than a rectangular parallelepiped, an oval columnar shape, an elliptical columnar shape, a columnar shape, or the like.

As shown in FIGS. 2 and 3, the energy storage device 10 includes the case 100, two pairs of electrode terminals 300, and two pairs of outer gaskets 400. Two pairs of inner gaskets 500, two pairs of current collectors 600, and an electrode assembly 700 are accommodated in the case 100. Specifically, a pair (positive electrode and negative electrode) of members (a pair of electrode terminals 300, a pair of outer gaskets 400, a pair of inner gaskets 500, a pair of current collectors 600, and the like; the same will apply hereinafter) are disposed at one end portion of the case 100 in the X-axis plus direction, and the remaining pair (positive electrode and negative electrode) of members are disposed at the other end portion of the case 100 in the X-axis minus direction. More specifically, on a first side surface portion 110 of the case 100 in the X-axis plus direction, each positive electrode member is disposed in the Z-axis plus direction, and each negative electrode member is disposed in the Z-axis minus direction. That is, the first side surface portion 110 is a range in which the respective positive and negative electrode members in the X-axis plus direction are disposed from the end face of the case 100 in the X-axis plus direction. For example, the first side surface portion 110 is a portion within a range of 1% to 10% of the length of the case 100 from the end face of the case 100 in the X-axis plus direction in the X-axis direction.

On a second side surface portion 120 of the case 100 in the X-axis plus direction, each negative electrode member is disposed in the Z-axis plus direction, and each positive electrode member is disposed in the Z-axis minus direction. That is, the second side surface portion 120 is a range in which the respective positive and negative electrode members in the X-axis minus direction are disposed from the end face of the case 100 in the X-axis minus direction. For example, the second side surface portion 120 is a portion within a range of 1% to 10% of the length of the case 100 from the end face of the case 100 in the X-axis minus direction in the X axis direction.

On the first side surface portion 110 and the second side surface portion 120 of the case 100, each positive electrode member and each negative electrode member are disposed to be inverted (vertically inverted) as viewed from the direction along the winding axis (as viewed in the X-axis direction).

Although an electrolyte solution (nonaqueous electrolyte) is sealed in the case 100, an illustration thereof is omitted. The type of electrolyte solution is not particularly limited as long as it does not impair the performance of the energy storage device 10, and various types of electrolytes can be selected. In addition to the above constituent devices, a spacer disposed on a side, an upper side, a lower side, or the like of the electrode assembly 700, an insulating film enclosing the electrode assembly 700, and the like may be disposed.

The case 100 is a case having an outer shape (substantially rectangular parallelepiped shape) based on a rectangular parallelepiped shape that is long and flat in the X-axis direction. For example, the case 100 has a length in the X-axis direction 3 times or more the length in the Z-axis direction. Referring to FIG. 2, a rectangular parallelepiped shape as a reference is indicated by a two-dot chain line L1. Specifically, the case 100 has an outer shape having rectangular notches formed at upper and lower portions of both end portions in the X-axis direction with respect to a rectangular parallelepiped shape that is long and flat in the X-axis direction. It can also be said that each notch forms a recess portion when viewed from a rectangular parallelepiped shape as a reference. Among the plurality of notches, each of a pair of notches located at the upper portion of the case 100 forms a first recess portion 101, and each of a pair of notches located at the lower portion of the case 100 forms a second recess portion 102. That is, on each of the first side surface portion 110 and the second side surface portion 120 of the case 100, the first recess portion 101 and the second recess portion 102 are formed at different positions in the Z-axis direction so as to face each other in the Z-axis direction. The electrode terminal 300 is disposed in each of the first recess portion 101 and the second recess portion 102. Therefore, in each of the first side surface portion 110 and the second side surface portion 120 of the case 100, the first recess portion 101 and (the whole of) the electrode terminal 300 in the second recess portion 102 face each other in the Z-axis direction, and the second recess portion 102 and (the whole of) the electrode terminal 300 in the first recess portion 101 face each other in the Z-axis direction.

Specifically, the first side surface portion 110 includes a first upper side surface 111, a first upper surface 112, a first middle side surface 113, a first lower surface 114, and a first lower side surface 115 and is long in the Z-axis direction as viewed in the X-axis direction. The first upper side surface 111 is disposed above the first side surface portion 110 and is a rectangular flat surface parallel to a YZ plane and elongated in the Z-axis direction. The first upper surface 112 is a plane extending in the X-axis plus direction from the lower end of the first upper side surface 111 and is a rectangular plane parallel to an XY plane and elongated in the X-axis direction. The first middle side surface 113 is a plane extending downward from an end of the first upper surface 112 in the positive direction of the X axis, and is a rectangular plane parallel to the YZ plane and elongated in the Z axis direction. The first lower surface 114 is a plane extending in the X-axis minus direction from the lower end of the first middle side surface 113 and is a rectangular plane parallel to an XY plane and elongated in the X-axis direction. The first lower side surface 115 is a plane extending downward from an end portion of the first lower surface 114 in the X-axis minus direction and is a rectangular plane parallel to a YZ plane and elongated in the Z-axis direction.

The first recess portion 101 of the first side surface portion 110 is formed of the first upper side surface 111 and the first upper surface 112, and an end portion in the Z-axis plus direction and an end portion in the X-axis plus direction are opened. The second recess portion 102 of the first side surface portion 110 is formed of the first lower surface 114 and the first lower side surface 115, and an end portion in the Z-axis plus direction and an end portion in the X-axis plus direction are opened. Therefore, at the end of the first side surface portion 110 in the Z-axis plus direction (the corner portion of the case 100 in the X-axis plus direction and the Z-axis plus direction), the surfaces in the X-axis direction and the Z-axis direction are recessed and penetrate in the Y-axis direction. On the other hand, at the end of the first side surface portion 110 in the Z-axis minus direction (the corner portion of the case 100 in the X-axis plus direction and the Z-axis minus direction), the surfaces in the X-axis direction and the Z-axis direction are recessed and penetrate in the Y-axis direction. In other words, the first recess portion 101 of the first side surface portion 110 is a recess portion in which a corner portion of the case 100 in the X-axis plus direction and the Z-axis plus direction is recessed (notched) in a quadrangular shape (L shape) when viewed from the Y-axis direction. The second recess portion 102 of the first side surface portion 110 is a recess portion in which a corner portion of the case 100 in the X-axis plus direction and the Z-axis minus direction is recessed (notched) in a quadrangular shape (L shape) when viewed from the Y-axis direction.

The second side surface portion 120 includes a second upper side surface 121, a second upper surface 122, a second middle side surface 123, a second lower surface 124, and a second lower side surface 125 and is long in the Z-axis direction as viewed in the X-axis direction. The second upper side surface 121 is disposed above the second side surface portion 120 and is a rectangular flat surface parallel to a YZ plane and elongated in the Z-axis direction. The second upper surface 122 is a plane extending in the X-axis minus direction from the lower end of the second upper side surface 121 and is a rectangular plane parallel to an XY plane and elongated in the X-axis direction. The second middle side surface 123 is a plane extending downward from an end portion of the second upper surface 122 in the X-axis minus direction and is a rectangular plane parallel to a YZ plane and elongated in the Z-axis direction. The second lower surface 124 is a plane extending in the X-axis plus direction from the lower end of the second middle side surface 123 and is a rectangular plane parallel to an XY plane and elongated in the X-axis direction. The second lower side surface 125 is a plane extending downward from an end portion of the second lower surface 124 in the X-axis minus direction and is a rectangular plane parallel to a YZ plane and elongated in the Z-axis direction.

The first recess portion 101 of the second side surface portion 120 is formed of the second upper side surface 121 and the second upper surface 122, and an end portion in the Z-axis plus direction and an end portion in the X-axis minus direction are opened. The second recess portion 102 of the second side surface portion 120 is formed of the second lower surface 124 and the second lower side surface 125, and an end portion in the Z-axis minus direction and an end portion in the X-axis minus direction are opened. Therefore, at the end of the second side surface portion 120 in the Z-axis plus direction (the corner portion of the case 100 in the X-axis minus direction and the Z-axis plus direction), the surfaces in the X-axis direction and the Z-axis direction are recessed and penetrate in the Y-axis direction. On the other hand, at the end of the second side surface portion 120 in the Z-axis minus direction (the corner portion of the case 100 in the X-axis minus direction and the Z-axis minus direction), the surfaces in the X-axis direction and the Z-axis direction are recessed and penetrate in the Y-axis direction. In other words, the first recess portion 101 of the second side surface portion 120 is a recess portion in which a corner portion of the case 100 in the X-axis minus direction and the Z-axis plus direction is recessed (notched) in a quadrangular shape when viewed from the Y-axis direction. The second recess portion 102 of the second side surface portion 120 is a recess portion in which a corner portion of the case 100 in the X-axis minus direction and the Z-axis minus direction is recessed (notched) in a quadrangular shape when viewed from the Y-axis direction.

Both end faces of the case 100 which face each other in the Y-axis direction are long side surfaces 130. Each long side surface 130 is a plane parallel to an XZ plane and elongated in the X-axis direction, and both end portions in the X-axis direction have shapes corresponding to the first side surface portion 110 and the second side surface portion 120.

Among both end faces of the case 100 which face each other in the Z-axis direction, the end face in the Z-axis plus direction is a top surface 140, and the end face in the Z-axis minus direction is a bottom surface 150. The top surface 140 is a rectangular plane parallel to an XY plane and elongated in the X-axis direction, connecting the upper end of the first upper side surface 111 of the first side surface portion 110 and the upper end of the second upper side surface 121 of the second side surface portion 120. The bottom surface 150 is a rectangular plane parallel to an XY plane and elongated in the X-axis direction, connecting the lower end of the first lower side surface 115 of the first side surface portion 110 and the lower end of the second lower side surface 125 of the second side surface portion 120.

The case 100 includes a case main body 160 and a lid body 170 and has a substantially rectangular parallelepiped shape obtained by assembling the case main body 160 and the lid body 170. The case main body 160 has the pair of long side surfaces 130 and the bottom surface 150. The lid body 170 has the first upper side surface 111, the first upper surface 112, the first middle side surface 113, the first lower surface 114, the first lower side surface 115, the second upper side surface 121, the second upper surface 122, the second middle side surface 123, the second lower surface 124, the second lower side surface 125, and the top surface 140.

Specifically, the case main body 160 is a substantially U-shaped sheet metal whose upper side is opened as viewed in the X-axis direction. The case main body 160 has long side wall portions having a flat plate shape and forming a pair of long side surfaces 130 at both end portions in the Y-axis direction and has bottom wall portions having a flat plate shape and a rectangular shape and forming the bottom surface 150 at an end portion in the Z-axis minus direction.

The lid body 170 is a sheet metal opened downward as viewed in the Y-axis direction. The lid body 170 has a bending plate portion forming the first upper side surface 111, the first upper surface 112, the first middle side surface 113, the first lower surface 114, and the first lower side surface 115 at an end in the X-axis plus direction, has a bending plate portion forming the second upper side surface 121, the second upper surface 122, the second middle side surface 123, the second lower surface 124, and the second lower side surface 125 at an end portion in the X-axis minus direction, and has a flat and rectangular top wall portion forming the top surface 140 at an end portion in the Z-axis plus direction.

With such a configuration, the case 100 has a structure internally sealed by joining the case main body 160 and the lid body 170 by welding or the like after the electrode assembly 700 and the like are accommodated in the case main body 160. The material for the case 100 (the case main body 160 and the lid body 170) is not particularly limited, but is preferably a weldable metal such as stainless steel, aluminum, an aluminum alloy, iron, or a plated steel plate.

Although not illustrated, the lid body 170 is formed with an electrolyte solution filling portion and a gas release valve. The gas release valve is a safety valve that releases pressure when the pressure inside the case 100 is excessively increased. The electrolyte solution filling portion is a portion for filling an electrolyte solution into the inside of the case 100 at the time of manufacturing the energy storage device 10.

The electrode terminal 300 is a terminal (the positive electrode terminal 310 and the negative electrode terminal 320) electrically connected to the electrode assembly 700 through the current collector 600. That is, the electrode terminal 300 is a metal member for leading out electricity stored in the electrode assembly 700 to a space outside the energy storage device 10 and for introducing electricity into a space inside the energy storage device 10 for storing electricity in the electrode assembly 700. The material of the electrode terminal 300 is not particularly limited, but for example, the electrode terminal 300 (the positive electrode terminal 310 and the negative electrode terminal 320) is formed of a conductive member such as aluminum, an aluminum alloy, copper, or a copper alloy. The electrode terminal 300 is connected (joined) to the current collector 600 by caulking joining, welding, or the like and is attached to the lid body 170.

In the present embodiment, the electrode terminal 300 includes a terminal body portion 330 and a shaft portion 340 projecting from the terminal body portion 330. The terminal body portion 330 is a portion projecting outward from the terminal installation surface of the case 100. Here, the terminal installation surface is the first upper surface 112, the first lower surface 114, the second upper surface 122, or the second lower surface 124. On any terminal installation surface, the terminal body portion 330 projects outward from the case 100 along the Z-axis direction. Through holes 112*a*, 114*a*, 122*a*, and 124*a* through which the shaft portion 340 extends are formed in portions of the lid body 170 which correspond to the respective terminal installation surfaces. The shaft portion 340 is connected (joined) to the current collector 600 by being caulked in a state of extending through the terminal installation surface, the outer gasket 400, the inner gasket 500, and the current collector 600. The positional relationship between the terminal body portion 330 and each recess portion (the first recess portion 101 and the second recess portion 102) after joining will be described later.

The current collectors 600 are conductive current collecting members (a positive electrode current collector 610 and a negative electrode current collector 620) which are disposed on both sides of the electrode assembly 700 in the X-axis direction, are connected (joined) to the electrode assembly 700 and the electrode terminal 300, and electrically connect the electrode assembly 700 and the electrode terminal 300. To be more specific, the current collector 600 integrally includes a first joint portion 630 which is connected (joined) to a tab portion 720 of the electrode assembly 700 described later by welding, caulking joining, or the like and a second joint portion 640 which is connected (joined) to the electrode terminal 300 by caulking joining, welding, or the like as described above. Each of the first joint portion 630 and the second joint portion 640 is a flat plate-like portion and is formed by bending one sheet metal. The material of the current collector 600 is not particularly limited, but for example, the positive electrode current collector 610 is formed of a conductive member such as aluminum or an aluminum alloy similarly to a positive electrode substrate 741 of the electrode assembly 700 described later, and the negative electrode current collector 620 is formed of a conductive member such as copper or a copper alloy similarly to a negative electrode substrate 751 of the electrode assembly 700 described later.

The outer gasket 400 is a plate-like rectangular insulating sealing member that is disposed between the lid body 170 of the case 100 and the electrode terminal 300 and insulates and seals between the lid body 170 and the electrode terminal 300. The inner gasket 500 is a plate-like rectangular insulating sealing member that is disposed between the lid body 170 and the current collector 600 and insulates and seals between the lid body 170 and the current collector 600. The outer gasket 400 and the inner gasket 500 are formed of, for example, a resin having electrical insulation properties such as polypropylene (PP), polyethylene (PE), polystyrene (PS), a polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene-perfluoroalkyl vinyl ether (PFA), polytetrafluoroethylene (PTFE), polyether sulfone (PES), or an ABS resin or a composite material thereof.

The electrode assembly 700 is an energy storage device (power generating device) which is formed by winding plates and can store electricity. The electrode assembly 700 has an elongated shape extending in the X-axis direction and has an oval shape as viewed in the X axis direction. The electrode assembly 700 has a shape with a length in the X-axis direction extending to, for example, 300 mm or more, specifically, about 500 mm to 1500 mm. Therefore, the length of the electrode assembly 700 in the X-axis direction is longer than the length thereof in the Z-axis direction. For example, the electrode assembly 700 has a length in the X-axis direction 3 times or more the length in the Z-axis direction. The electrode assembly 700 includes a main body portion 710 and a plurality of tab portions 720 projecting from the main body portion 710, and the tab portions 720 are connected (joined) to the current collector 600 as described above. The tab portion 720 is an example of a connection portion connected to the current collector 600.

Specifically, a pair of the plurality of tab portions 720 projecting from each of both end faces of the main body portion 710 in the X-axis direction. For example, on one end face of the main body portion 710 in the X-axis plus direction, positive electrode tab portions 721 are provided at a predetermined interval from an end portion in the Z-axis plus direction, and negative electrode tab portions 722 are provided at a predetermined interval from an end portion in the Z-axis minus direction. On the other hand, on the other end face of the main body portion 710 in the X-axis minus direction, negative electrode tab portions 722 are provided at a predetermined interval from an end portion in the Z-axis plus direction, and positive electrode tab portions 721 are provided at a predetermined interval from an end portion in the Z-axis minus direction. That is, on one end face and the other end face of the main body portion 710, the positive electrode tab portion 721 and the negative electrode tab portion 722 are disposed to be inverted (vertically inverted) as viewed from a direction along the winding axis (as viewed in the X-axis direction).

For example, in the case of an electrode assembly which is long in the X-axis direction and in which the positive electrode tab portion is provided only at one end portion in the X-axis direction and the negative electrode tab portion is provided only at the other end portion in the X-axis direction, the distance between the positive electrode tab portion and the negative electrode tab portion becomes long. This is not preferable because an increase in electric resistance and occurrence of reaction unevenness are induced. In the present embodiment, the positive electrode tab portion 721 and the negative electrode tab portion 722 are respectively provided on one end face and the other end face of the main body portion 710 of the electrode assembly 700. Therefore, the distance between the positive electrode tab portion 721 and the negative electrode tab portion 722 is shortened at each end face of the main body portion 710, so that an increase in electric resistance and occurrence of reaction unevenness are suppressed. The configuration of the electrode assembly 700 will be described in detail below.

[Electrode Assembly]

Figure 4:
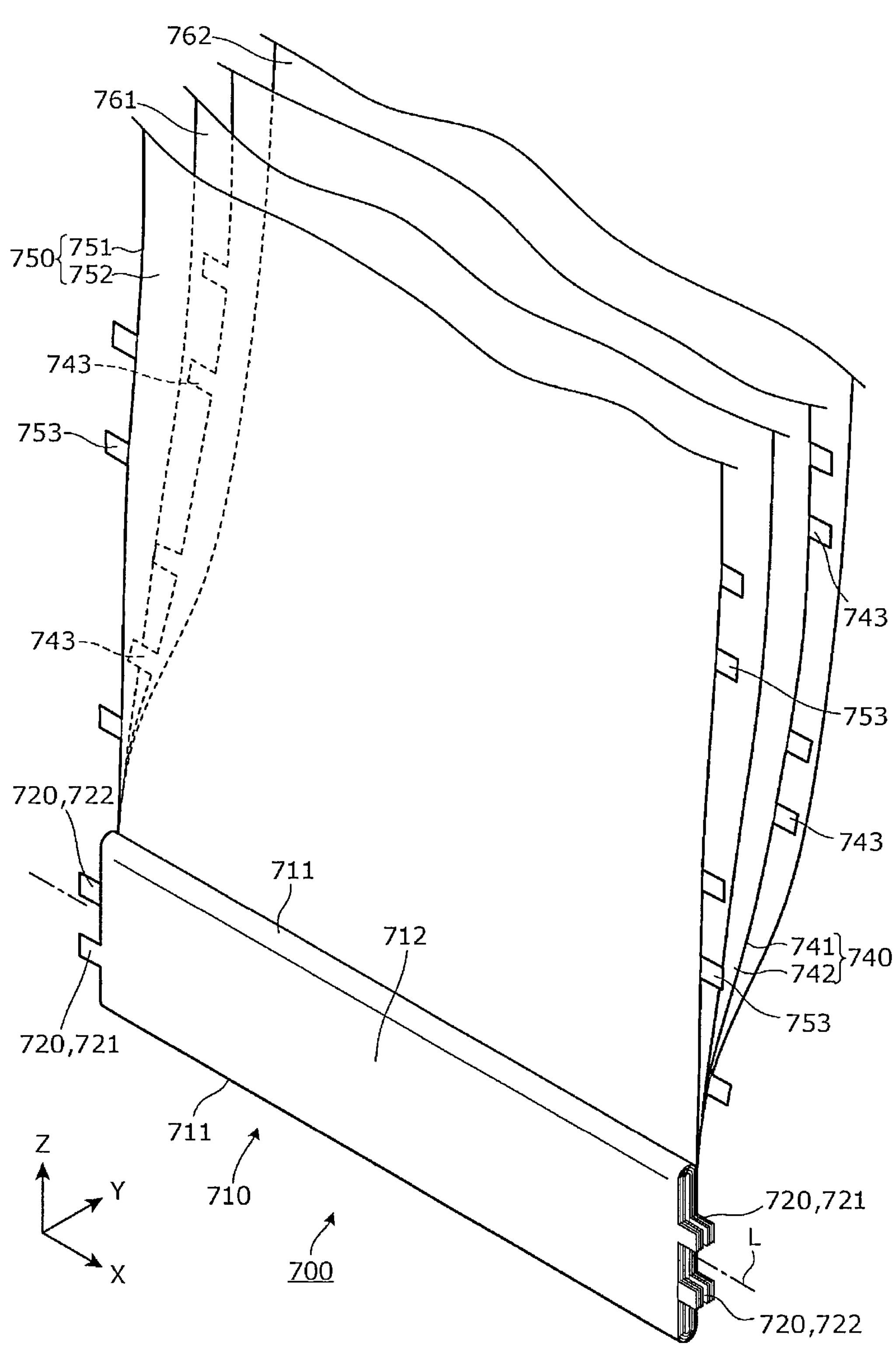
FIG. 4 is a perspective view showing the configuration of an electrode assembly according to the embodiment.

FIG. 4 is a perspective view showing the configuration of the electrode assembly 700 according to the embodiment. Specifically, FIG. 4 shows a configuration in a state where the wound state of the plates of the electrode assembly 700 is partially developed. As shown in FIG. 4, the electrode assembly 700 includes a positive electrode plate 740, a negative electrode plate 750, and separators 761 and 762.

The positive electrode plate 740 is a plate (electrode plate) having a positive active material layer 742 formed on a surface of the positive electrode substrate 741 which is an elongated strip-shaped metal foil made of aluminum, an aluminum alloy, or the like. The negative electrode plate 750 is a plate (electrode plate) having a negative active material layer 752 formed on a surface of the negative electrode substrate 751 which is an elongated strip-shaped metal foil made of copper, a copper alloy, or the like. As the positive electrode substrate 741 and the negative electrode substrate 751, known materials such as nickel, iron, stainless steel, titanium, calcined carbon, a conductive polymer, a conductive glass, and an Al—Cd alloy can be appropriately used as long as the materials are stable to an oxidation-reduction reaction during charging and discharging. As the positive active material used for the positive active material layer 742 and the negative active material used for the negative active material layer 752, known materials can be appropriately used as long as they are a positive active material and a negative active material capable of occluding and discharging lithium ions.

For example, it is possible to use, as the positive active material, a polyanion compound such as $LiMPO_4$, $LiMSiO_4$, or $LiMBO_3$ (M represents one or more transition metal devices selected from Fe, Ni, Mn, Co, and the like), lithium titanate, a spinel type lithium manganese oxide such as $LiMn_2O_4$ or $LiMn_{1.5}Ni_{0.5}O_4$, a lithium transition metal oxide such as $LiMO_2$ (M represents one or more transition metal devices selected from Fe, Ni, Mn, Co, and the like), or the like. Examples of the negative active material include lithium metal, a lithium alloy (lithium metal-containing alloys such as lithium-silicon, lithium-aluminum, lithium-lead, lithium-tin, lithium-aluminum-tin, lithium-gallium, and Wood's alloy), an alloy capable of occluding and releasing lithium, a carbon material (for example, graphite, non-graphitizable carbon, graphitizable carbon, low-temperature calcined carbon, and amorphous carbon), a silicon oxide, a metal oxide, a lithium metal oxide ($Li_4Ti_5O_{12}$ or the like), a polyphosphoric acid compound, and a compound of a transition metal and a group 14 to 16 device, such as $Co_3O_4$ or $Fe_2P$, which is generally called a conversion negative electrode.

The separators 761 and 762 are microporous sheets made of a resin. As a material for the separators 761 and 762, a known material can be appropriately used as long as the performance of the energy storage device 10 is not impaired. For example, as the separators 761 and 762, a woven fabric insoluble in an organic solvent, a nonwoven fabric, a synthetic resin microporous membrane made of a polyolefin resin such as polyethylene can be used.

The electrode assembly 700 is formed by alternately stacking and winding the positive electrode plate 740, the negative electrode plate 750, and the separators 761 and 762. That is, the electrode assembly 700 is formed by stacking and winding the negative electrode plate 750, the separator 761, the positive electrode plate 740, and the separator 762 in this order. In the present embodiment, the electrode assembly 700 is a winding-type electrode assembly formed by winding the positive electrode plate 740, the negative electrode plate 750, and the like around a winding axis L extending in the X-axis direction. The winding axis L is a virtual axis which is a central axis when the positive electrode plate 740, the negative electrode plate 750, and the like are wound, and in the present embodiment, the winding axis L is a straight line which passes through the center of the electrode assembly 700 and is parallel to the X-axis direction.

On both end edges of the positive electrode plate 740 in the winding axis direction, a plurality of projecting pieces 743 projecting outward are disposed at intervals. Similarly, a plurality of projecting pieces 753 projecting outward are arranged at intervals on both end edges of the negative electrode plate 750 in the winding axis direction. In the state after stacking the layers, the respective projecting pieces 743 of the positive electrode plate 740 and the respective projecting pieces 753 of the negative electrode plate 750 are alternately and repeatedly arranged every two pieces in the longitudinal direction of the positive electrode plate 740 and the negative electrode plate 750. Each of the projecting pieces 743 and 753 is a portion (active material layer-non-formed portion) where the active material layer containing the active material is not formed and the substrate material layer is exposed.

When the positive electrode plate 740, the negative electrode plate 750, and the separators 761 and 762 are wound, the projecting pieces 743 of the positive electrode plate 740 overlap each other and the projecting pieces 753 of the negative electrode plate 750 overlap each other at one end face and the other end face of the main body portion 710, respectively. A portion where the projecting pieces 743 of the positive electrode plate 740 overlap each other is a positive electrode tab portion 721. That is, the positive electrode tab portion 721 is a portion formed by stacking a plurality of pieces (projecting pieces 743) of one plate (positive electrode plate 740) having the same polarity among a plurality of plates (positive electrode plate 740 and negative electrode plate 750).

Similarly, a portion where the projecting pieces 753 of the negative electrode plate 750 overlap each other is a negative electrode tab portion 722. That is, the negative electrode tab portion 722 is a portion formed by stacking a plurality of pieces (projecting pieces 753) of one plate (negative electrode plate 750) having the same polarity among a plurality of plates (positive electrode plate 740 and negative electrode plate 750).

As described above, the electrode assembly 700 includes the main body portion 710 which forms the body of the electrode assembly 700 and the plurality of tab portions 720 (the positive electrode tab portion 721 and the negative electrode tab portion 722) which project as a pair from both end faces of the main body portion 710 in the X-axis direction respectively.

The main body portion 710 is an elliptic cylindrical portion (active material layer forming portion) formed by winding portions of the positive electrode plate 740 and the negative electrode plate 750 where the positive active material layer 742 and the negative active material layer 752 are formed (applied) and the separators 761 and 762. As a result, the main body portion 710 has a pair of curved portions 711 on both sides in the Z-axis direction and has flat portions 712 which are flat as a whole between the pair of curved portions 711. It can also be said that the pair of curved portions 711 are disposed at positions sandwiching the flat portions 712 in the Z-axis direction.

The curved portion 711 is a curved portion that is curved in a semicircular arc shape so as to project in the Z-axis direction as viewed in the X-axis direction and extends in the X axis direction and is disposed to face the bottom wall portion of the case main body 160 and the top wall portion of the lid body 170. That is, the pair of curved portions 711 are portions curved so as to project from the flat portion 712 to both sides in the Z-axis direction toward the bottom wall portion of the case main body 160 and the top wall portion of the lid body 170 as viewed in the X-axis direction.

The flat portion 712 is a rectangular and flat portion which connects the end portions of the pair of curved portions 711 to each other and extends parallel to an XZ plane directed in the Y-axis direction and is disposed to face the long side wall portions of the case main body 160 on both sides in the Y-axis direction. The flat portion 712 is a main portion of the electrode assembly 700. On the flat portion 712, a plurality of wound plates (the positive electrode plate 740 and the negative electrode plate 750) are stacked in the Y-axis direction. That is, on the flat portion 712, the Y-axis direction is the stacking direction of the plurality of plates. As described above, since the flat portion 712 is a main portion of the electrode assembly 700, the main stacking direction of the electrode assembly 700 is defined as the Y-axis direction in the present disclosure.

The curved shape of the curved portion 711 is not limited to the semicircular arc shape, may be a part of an elliptical shape or the like, and may be curved in any manner. The outer surface of the flat portion 712 facing the Y-axis direction is not limited to a flat surface, and the outer surface may be slightly recessed or slightly bulged.

[Positional Relationship Among Terminal Body Portion, Recess Portions, Electrode Assembly, and Current Collector]

The positional relationship among the terminal body portion 330, the recess portions (the first recess portion 101 and the second recess portion 102), the electrode assembly 700, and the current collector 600 will be described next. Here, the first recess portion 101 and the second recess portion 102 of the first side surface portion 110 will be described as an example, but the same applies to the second side surface portion 120, and thus a description of the second side surface portion 120 will be omitted.

Figure 5:
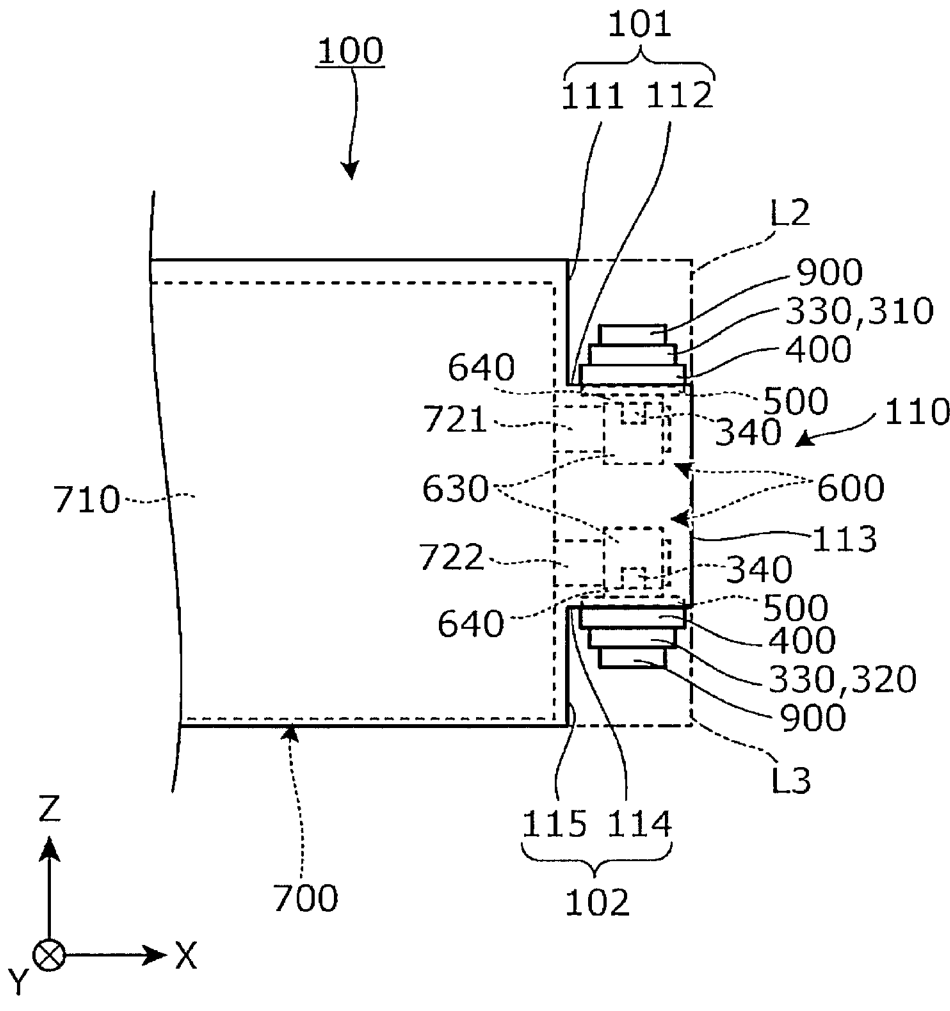
FIG. 5 is a plan view illustrating a first side surface portion according to the embodiment.

FIG. 5 is a plan view illustrating the first side surface portion 110 according to the embodiment. Referring to FIG. 5 as well, a rectangular parallelepiped shape as a reference of the case 100 is indicated by two-dot chain lines L2 and L3. Therefore, the "inside of the first recess portion 101"

means the inside of the region defined by the rectangular parallelepiped contour (the two-dot chain line L2) as a reference, the first upper side surface 111, and the first upper surface 112. Similarly, the "inside of the second recess portion 102" means the inside of the region defined by the rectangular parallelepiped outline (the two-dot chain line L3) as a reference, the first lower surface 114, and the first lower side surface 115.

FIG. 5 illustrates a state in which a bus bar 900 is joined to each terminal body portion 330. In this case, the plurality of energy storage devices 10 constituting the main power supply 11 are arranged in the Y-axis direction such that the long side surfaces 130 of the pair of energy storage devices 10 disposed adjacently to each other face each other. Accordingly, the bus bars 900 are plate-like conductive members extending in the Y-axis direction and are joined to the electrode terminals 300 of other energy storage devices. The bus bar 900 in the Z-axis plus direction is electrically connected to the drive system 3. On the other hand, the bus bar 900 in the Z-axis minus direction is electrically connected to the auxiliary machine system 4.

As shown in FIG. 5, in the first recess portion 101, the terminal body portion 330 of the positive electrode terminal 310 projects outward through the outer gasket 400 on the first upper surface 112 which is a terminal installation surface. In this state, the entire terminal body portion 330 of the positive electrode terminal 310 is accommodated in the first recess portion 101 as viewed in the Y-axis direction. That is, the terminal body portion 330 of the positive electrode terminal 310 is disposed below the top surface 140 as a whole. The entire bus bar 900 joined to the positive electrode terminal 310 is also accommodated in the first recess portion 101 as viewed in the Y-axis direction and is disposed below the top surface 140. That is, the bus bar 900 for the drive system 3 is disposed in each of the first recess portions 101 of the plurality of energy storage devices 10. Since the bus bar 900 for the drive system 3 can be disposed in the first recess portion 101 in this manner, it is possible to suppress the bus bar 900 for the drive system 3 from projecting to the outside of the case 100. Accordingly, space efficiency outside the energy storage device 10 can be enhanced.

In the first side surface portion 110, the positive electrode tab portion 721 and the negative electrode tab portion 722 of the electrode assembly 700 in the X-axis plus direction are disposed between the first recess portion 101 and the second recess portion 102. With such a configuration, the positive electrode tab portion 721 and the negative electrode tab portion 722 are disposed at positions evading the portions forming the first upper side surface 111 and the first lower side surface 115 respectively, and hence the main body portion 710 of the electrode assembly 700 can be brought close to the portions forming the first upper side surface 111 and the first lower side surface 115 respectively. Therefore, it is possible to form the main body portion 710, which is a portion contributing to power storage (power generation), as large as possible.

The current collector 600 joined to the positive electrode tab portion 721 extends in the Z-axis direction in a space overlapping the first upper surface 112 in a plan view of the first upper surface 112 which is a terminal installation surface. Specifically, the first joint portion 630 of the current collector 600 joined to the positive electrode tab portion 721 is a plate-like portion extending in the Z-axis direction and is joined to the positive electrode tab portion 721. The second joint portion 640 of the current collector 600 is a plate-like portion bent from the upper end of the first joint portion 630 and is joined to the shaft portion 340 of the positive electrode terminal 310. The first joint portion 630 and the second joint portion 640 are accommodated in a space overlapping the first upper surface 112 in a plan view of the first upper surface 112. That is, the first joint portion 630 and the positive electrode tab portion 721 are joined in the space in a state where the current collector 600 does not protrude from the space, and the joining structure thereof does not protrude from the space.

In the second recess portion 102, the terminal body portion 330 of the negative electrode terminal 320 projects outward through the outer gasket 400 on the first lower surface 114 which is a terminal installation surface. In this state, the entire terminal body portion 330 of the negative electrode terminal 320 is accommodated in the second recess portion 102 as viewed in the Y-axis direction. That is, the terminal body portion 330 of the negative electrode terminal 320 is disposed above the bottom surface 150 as a whole. The entire bus bar 900 joined to the negative electrode terminal 320 is also accommodated in the second recess portion 102 as viewed in the Y-axis direction and is disposed above the bottom surface 150. That is, the bus bar 900 for the auxiliary machine system 4 is disposed in each of the second recess portions 102 of the plurality of energy storage devices 10. Since the bus bar 900 for the auxiliary machine system 4 can be disposed in the second recess portion 102 in this manner, it is possible to suppress the bus bar 900 for the auxiliary machine system 4 from projecting to the outside of the case 100. Accordingly, space efficiency outside the energy storage device 10 can be enhanced.

Since the second side surface portion 120 also has the same configuration as the first side surface portion 110 as described above, the terminal body portion 330 and the bus bar 900 in each of the first recess portions 101 are disposed below the top surface 140 and do not project from the top surface 140. Similarly, the terminal body portion 330 and the bus bar 900 in each of the second recess portions 102 are disposed above the bottom surface 150 and do not project from the bottom surface 150.

The current collector 600 joined to the negative electrode tab portion 722 extends in the Z-axis direction in a space overlapping the first lower surface 114 in a plan view of the first lower surface 114 which is a terminal installation surface. Specifically, the first joint portion 630 of the current collector 600 joined to the negative electrode tab portion 722 is a plate-like portion extending in the Z-axis direction and is joined to the negative electrode tab portion 722. The second joint portion 640 of the current collector 600 is a plate-like portion bent from the upper end of the first joint portion 630 and is joined to the shaft portion 340 of the negative electrode terminal 320. The first joint portion 630 and the second joint portion 640 are accommodated in a space overlapping the first lower surface 114 in a plan view of the first lower surface 114. That is, the first joint portion 630 and the negative electrode tab portion 722 are joined in the space in a state where the current collector 600 does not protrude from the space, and the joining structure thereof does not protrude from the space. As described above, since the joint structure of the positive electrode tab portion 721 and the current collector 600 does not protrude from the space, the main body portion 710 of the electrode assembly 700 can be disposed as large as possible.

Figure 6:
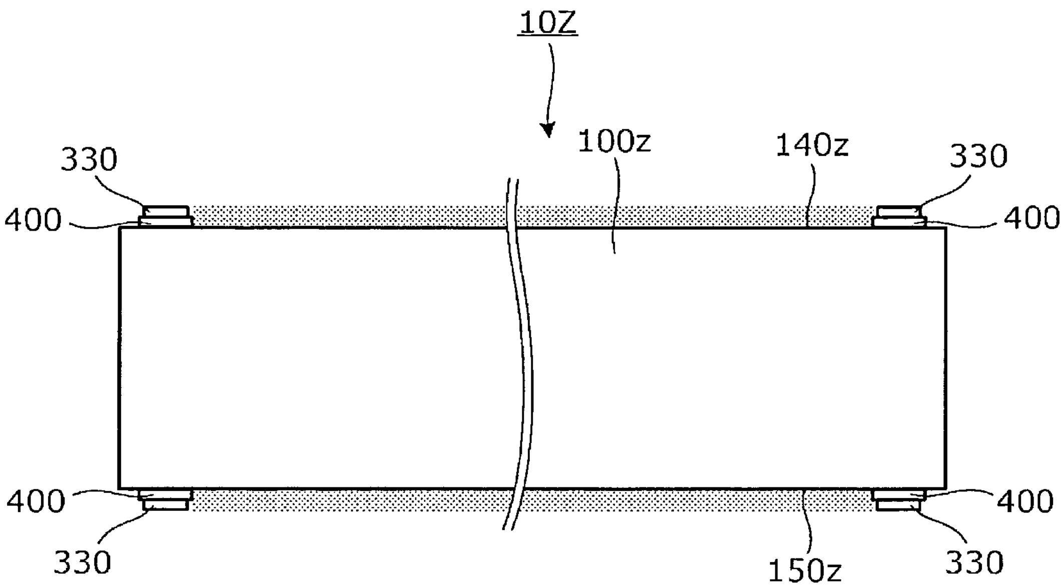
FIG. 6 is a plan view schematically showing an energy storage device according to a comparative example.
Figure 6:
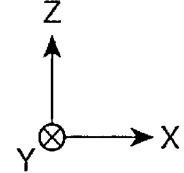

FIG. 6 is a plan view schematically showing an energy storage device 10Z according to a comparative example. As shown in FIG. 6, in the energy storage device 10Z, a case 100*z* is formed in a rectangular parallelepiped shape without having a first recess portion and a second recess portion.

Therefore, in the comparative example, a top surface 140*z* of the case 100*z* is provided with a pair of electrode terminals 300, and a bottom surface 150*z* is provided with a pair of electrode terminals 300. On the top surface 140*z* of the energy storage device 10Z according to the comparative example, since the pair of electrode terminals 300 project from the top surface 140*z*, a space between the pair of electrode terminals 300 becomes a surplus space (the dot hatched portion in FIG. 6). Similarly, on the bottom surface 150*z*, since the pair of electrode terminals 300 project from the bottom surface 150*z*, a space between the pair of electrode terminals 300 becomes a surplus space.

On the other hand, in the present embodiment, since the terminal body portion 330 in each of the first recess portions 101 does not project from the top surface 140, an excessive space outside the case 100 is reduced between the pair of electrode terminals 300 arranged pm the upper portion of the case 100 (see FIG. 5). Similarly, the surplus space outside the case 100 is reduced also between the pair of electrode terminals 300 arranged in the lower portion of the case 100.

[Control Method for Power Supply System]

A control method for the power supply system 1 will be described next. In this control method, when an abnormality has occurred in the supply of power from the main power supply 11, power may be supplied from the backup power supply to the drive system 3.

Specifically, a control method for the selector unit 16 by the control unit 15 will be described. First described is a case where the control unit 15 has not made neither the first determination nor the second determination, that is, a case where there is no abnormality in each of the main power supply 11 and the sub-power supply 12. In this case, as illustrated in FIG. 1, the control unit 15 opens all the switch units 161 provided in the selector unit 16. In this state, since power is supplied from the main power supply 11 to the drive system 3, the motor 6 is driven to rotate the drive wheel 5, and the moving body travels. In addition, power is supplied from the main power supply 11 to the auxiliary machine system 4 via the DC/DC converter 13, and power is supplied from the sub-power supply 12 to the auxiliary machine system 4, whereby power is supplied to the driving function unit 7, the utility unit 8, and the ECU9. During the deceleration of the moving body 2, the electric power generated by the motor 6 by regenerative braking is stored in the main power supply 11. Part of the generated power is transmitted to the auxiliary machine system 4 via the DC/DC converter 13 and stored in the sub-power supply 12.

Figure 7:
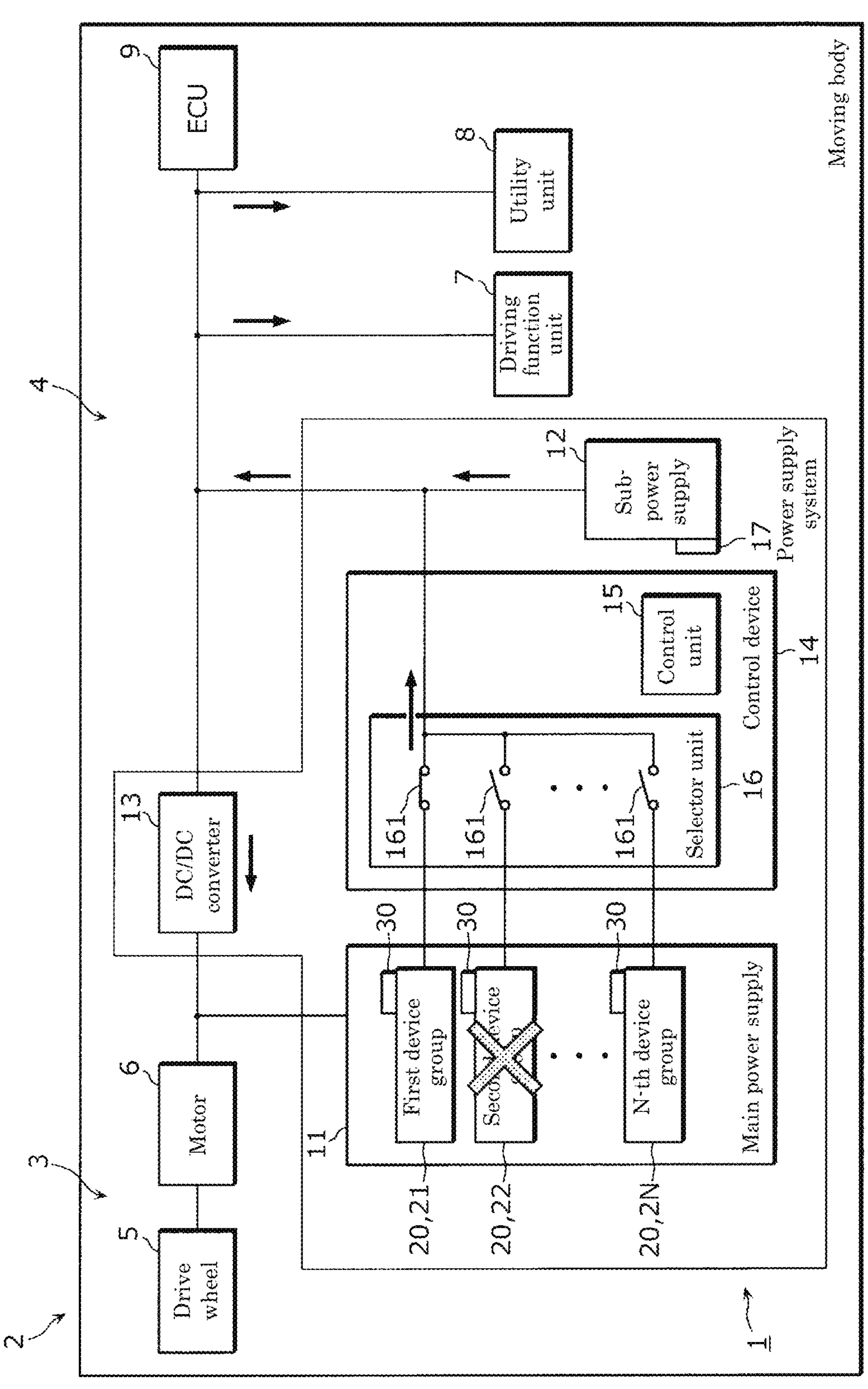
FIG. 7 is a block diagram illustrating a state of a selector unit when a control unit according to the embodiment has made a first determination.

Next described is a case where the control unit 15 has made the first determination, that is, a case where an abnormality has occurred in the main power supply 11. FIG. 7 is a block diagram illustrating a state of the selector unit 16 when the control unit 15 according to the embodiment has made the first determination.

As illustrated in FIG. 7, when an abnormality has occurred in the second device group 22 among the plurality of device groups 20, the supply of power from the main power supply 11 to the drive system 3 is also unstable or stopped. In this case, the control unit 15 performs the first determination based on the detection result obtained by the sensor 30 whose detection target is the second device group 22. At this time, since the device groups 20 other than the second device group 22 are normal, the control unit 15 determines to use at least one device group 20 (the first device group 21 in the present embodiment) from among the normal device groups 20 as a backup power supply. That is, the control unit 15 is an example of a determination unit that detects the state of each of the first device group 21 and the second device group 22 and determines to use one of the first device group 21 and the second device group 22 as a backup power supply based on the detection result.

The control unit 15 closes only the switch unit 161 of the first device group 21 determined to be used as a backup power supply and electrically connects the first device group 21 to the auxiliary machine system 4. As a result, power is supplied from the first device group 21 to the drive system 3 via the auxiliary machine system 4 and the DC/DC converter 13 for a predetermined time. At this time, power is also supplied from the sub-power supply 12 to the drive system 3 via the auxiliary machine system 4 and the DC/DC converter 13. Accordingly, although the voltage is significantly lower than the voltage at the normal time, the motor 6 of the drive system 3 can be auxiliarily driven. For example, the moving body 2 can be moved to a road shoulder that does not interfere with other moving bodies. Exemplified here is a case where power is also supplied from the sub-power supply 12 to the drive system 3 when power is supplied from the first device group 21 to the drive system 3 for a predetermined time. However, in a case where a predetermined condition is satisfied when power is supplied from the first device group 21 to the drive system 3, power may also be supplied from the sub-power supply 12 to the drive system 3. Examples of the predetermined condition include a period until the moving body 2 moves to a road shoulder.

[Effects]

When the main power supply 11 fails, not all of the plurality of energy storage devices 10 provided in the main power supply 11 fail, but only a few energy storage devices 10 among the plurality of energy storage devices 10 fail, or only a system and a wiring system related to the main power supply 11 fail, and most energy storage devices 10 remain normal. For this reason, in the power supply system 1 according to the present embodiment, the first device group 21 including at least one energy storage device 10 constituting a part of the plurality of energy storage devices 10 included in the main power supply 11 can be used as the backup power supply of the auxiliary machine system 4. That is, the first device group 21 has both power supply to the drive system 3 and backup power supply. Therefore, it is not necessary to provide a power supply dedicated to backup of the auxiliary machine system 4. Furthermore, even when the main power supply fails, the drive system can be driven by the supply of power from the first device group as a backup power supply in addition to the supply of power from the sub-power supply. That is, it is not necessary to adopt a high-power sub-power supply, and it is possible to reduce the weight and size of the sub-power supply. For these reasons, it is possible to reduce the weight and space of the entire system.

In addition, when one of the energy storage devices 10 provided in the main power supply 11 has failed, there is a possibility that a failure tends to be induced also in the neighboring energy storage device 10. The occurrence of such a cascading failure requires a certain period of time. For example, even when the energy storage device 10 adjacent to the failed energy storage device 10 is determined as a backup power supply, the moving body 2 can be moved to a road shoulder within the time until the cascading failure occurs.

Each of the first device group 21 and the second device group 22 is a backup power supply for the auxiliary machine system 4. For example, even if a failed energy storage device 10 is included in the first device group 21, there is a high possibility that all the energy storage devices 10 remain normal in the second device group 22. In this case, backup power can be supplied from the second device group 22 to the auxiliary machine system 4. Therefore, the reliability of the backup power supply can be enhanced.

Since the control unit 15 (determination unit) detects the state of each of the first device group 21 and the second device group 22 and determines the device group 20 to be used for backup on the basis of the detection result, it is possible to select the device group 20 suitable as a backup power supply at the present time. Therefore, the reliability of the backup power supply can be further improved.

When the main power supply 11 fails, the supply of power from the main power supply 11 to the drive system 3 may be interrupted. In the present embodiment, power can be supplied from the first device group 21, which is a backup power supply, to the drive system 3 via the auxiliary machine system 4. Consequently, although the voltage is significantly lower than the voltage at the normal time, the motor 6 of the drive system 3 can be auxiliarily driven. For example, the moving body 2 can be moved to a road shoulder that does not interfere with other moving bodies.

When the first device group 21, which is a backup power supply, supplies power to the drive system 3 for a predetermined time, power is also supplied from the sub-power supply 12 to the drive system 3 via the auxiliary machine system 4, so that stability when the motor 6 of the drive system 3 is auxiliarily driven can be enhanced.

Each of the energy storage devices 10 has two sets of the positive electrode terminals 310 and the negative electrode terminals 320 and hence, one set of the positive electrode terminal 310 and the negative electrode terminal 320 can be connected to the drive system 3 and the other set of the positive electrode terminal 310 and the negative electrode terminal 320 can be connected to the auxiliary machine system 4, whereby the circuit configuration can be simplified.

Description of Modification Example

Hereinafter, each modification example of the above embodiment will be described. In the following description, the same parts as those in the above embodiment or other modification examples are denoted by the same reference numerals, and a description thereof may be omitted.

Figure 8:
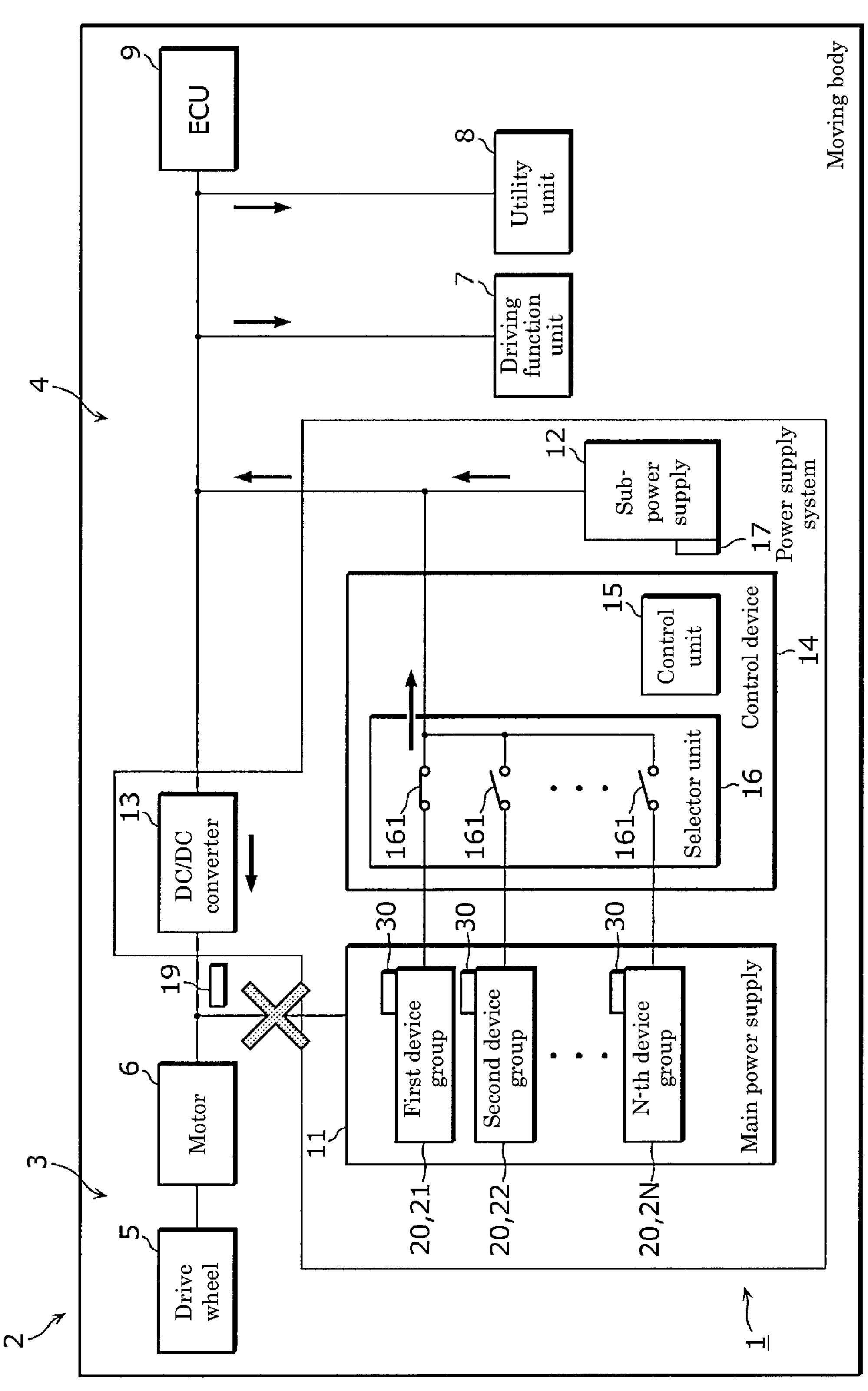
FIG. 8 is a block diagram illustrating a state of a selector unit when a control unit according to a first modification example makes a first determination.

A first modification example of the above embodiment will be described. FIG. 8 is a block diagram illustrating the state of the selector unit 16 when the control unit 15 according to the first modification example has made the first determination. For example, the above embodiment has exemplified the case where the control unit 15 performs the first determination when an abnormality has occurred in at least one device group 20 included in the main power supply 11. However, in the present modification example, as illustrated in FIG. 8, a state sensor 19 that detects the state of the supply of power from the main power supply 11 to the drive system 3 is provided outside the power supply system 1. That is, the state sensor 19 can collectively detect an abnormality in the state of the supply of power caused by an abnormality in at least one device group 20 and an abnormality in the state of the supply of power caused by an abnormality in the system or the wiring system of the main power supply 11. The state sensor 19 is electrically connected to the control unit 15. The control unit 15 makes a first determination when the state sensor 19 detects an abnormality in the state of the supply of power. At this time, the control unit 15 determines the normal device groups 20 on the basis of the detection result obtained by each sensor 30 and determines to use one device group 20 (the first device group 21 in the present modification example) from among the device groups as a backup power supply. The control unit 15 closes only the switch unit 161 of the first device group 21 determined to be used as a backup power supply and electrically connects the first device group 21 to the auxiliary machine system 4. As a result, power is supplied from the first device group 21 to the drive system 3 via the auxiliary machine system 4 and the DC/DC converter 13 for a predetermined time. At this time, power is also supplied from the sub-power supply 12 to the drive system 3 via the auxiliary machine system 4 and the DC/DC converter 13. Accordingly, although the voltage is significantly lower than the voltage at the normal time, the motor 6 of the drive system 3 can be auxiliarily driven. For example, the moving body 2 can be moved to a road shoulder that does not interfere with other moving bodies.

In the present modification example, since the state of the supply of power from the main power supply 11 to the drive system 3 is detected outside the power supply system 1, the motor 6 of the drive system 3 can be temporarily driven by a backup power supply even when an abnormality due to a cause other than each device group 20 has occurred in the main power supply 11 and its wiring.

Note that an abnormality sensor that detects an abnormality in a system or a wiring system of the main power supply 11 may be provided instead of the state sensor 19, and the control unit 14 may perform the first determination on the basis of the detection result obtained by the abnormality sensor and the detection result obtained by the sensor 30 of each sensor 30.

Figure 9:
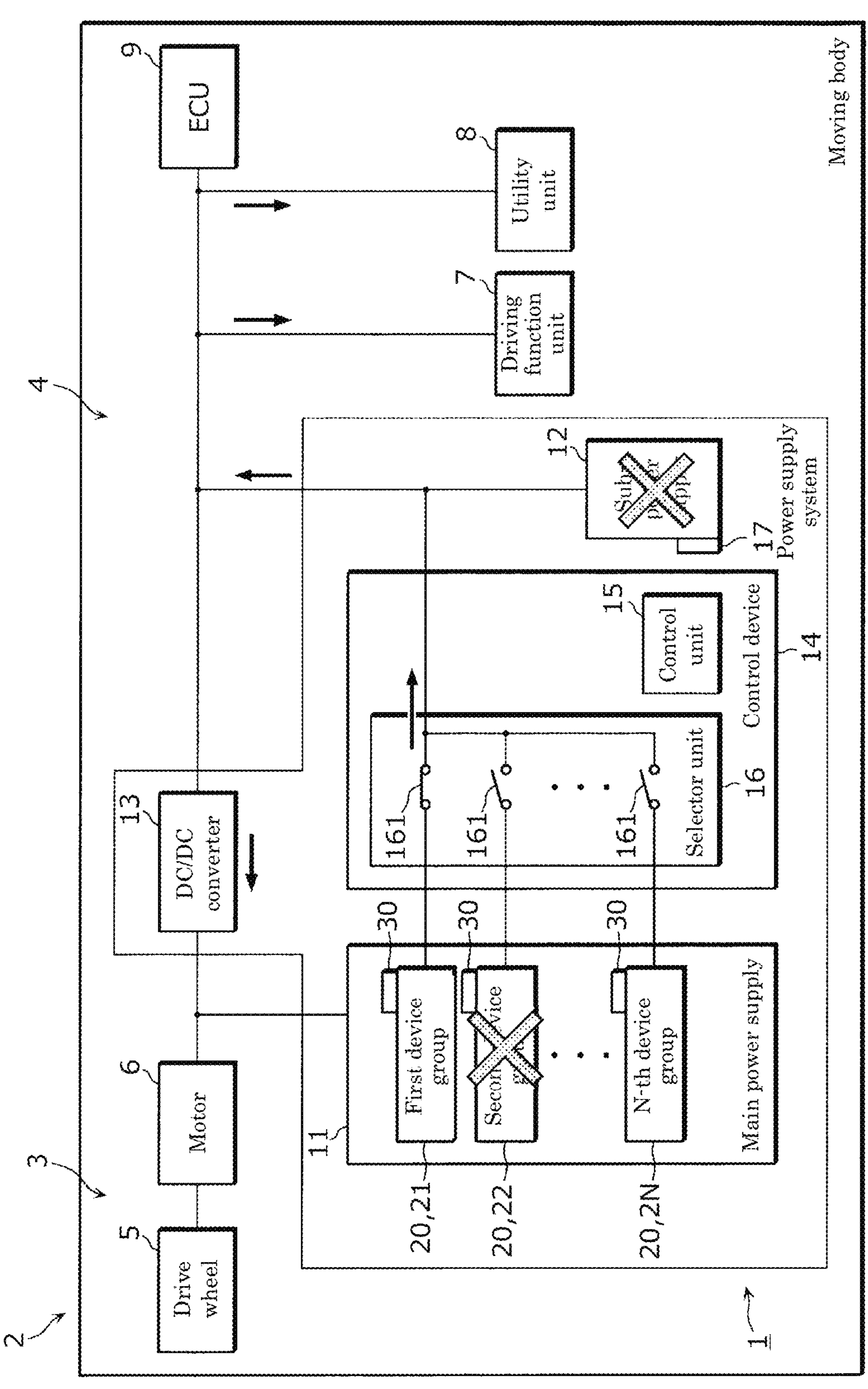
FIG. 9 is a block diagram illustrating a state of a selector unit when a control unit according to a second modification example makes a first determination and a second determination.

A second modification example of the above embodiment will be described. FIG. 9 is a block diagram illustrating a state of the selector unit 16 when the control unit 15 according to the second modification example makes a first determination and a second determination. FIG. 9 illustrates a case where an abnormality has occurred in at least one device group 20 included in the main power supply 11 and an abnormality has also occurred in the sub-power supply 12. In this case, the control unit 15 makes a first determination based on the detection result obtained by the sensor 30 whose detection target is, for example, the second device group 22 in which an abnormality has occurred and also makes a second determination when the abnormality sensor 17 detects an abnormality in the sub-power supply 12. At this time, the control unit 15 determines the normal device groups 20 on the basis of the detection result obtained by each sensor 30 and determines to use one device group 20 (the first device group 21 in the present modification example) from among the device groups as a backup power supply. The control unit 15 closes only the switch unit 161 of the first device group 21 determined to be used as a backup power supply and electrically connects the first device group 21 to the auxiliary machine system 4. As a result, power is supplied from the first device group 21 to the drive system 3 via the auxiliary machine system 4 and the DC/DC converter 13. Accordingly, although the voltage is significantly lower than the voltage at the normal time, the motor 6 of the drive system 3 can be auxiliarily driven. For example, the moving body 2 can be moved to a road shoulder that does not interfere with other moving bodies.

Accordingly, when an abnormality has occurred in the supply of power from each of the main power supply 11 and the sub-power supply 12, power is supplied from the backup power supply to each of the auxiliary machine system 4 and the drive system 3. Therefore, even when an abnormality has occurred in the main power supply 11 and the sub-power supply 12, the auxiliary machine system 4 and the drive system 3 can be operated by power from the backup power supply.

In a normal state, power is mainly supplied from the main power supply 11 to the drive system 3, and power is mainly supplied from the sub-power supply 12 to the auxiliary machine system 4. A case where an abnormality has occurred in the supply of power from the main power supply 11 to the drive system 3 and a case where an abnormality has occurred in the supply of power from the sub-power supply 12 to the auxiliary machine system 4 can be inclusively referred to as a case where an abnormality has occurred in the main supply of power to at least one of the auxiliary machine system 4 and the drive system 3. In any of the above embodiment, the first modification example, and the second modification example, since power is supplied from the backup power supply to the abnormal system among the drive system 3 and the auxiliary machine system 4, it is not necessary to provide a dedicated backup power supply. For this reason, it is possible to reduce the weight and space of the entire system.

Other Modification Examples

Although the power supply system according to the embodiment (including modification examples; the same applies hereinafter) of the present invention has been described above, the present invention is not limited to the above embodiment. The embodiment disclosed herein is an example in all respects, and the scope of the present invention includes all modifications within the meaning and scope equivalent to the claims.

For example, the above embodiment has exemplified the case where one device group 20 among the plurality of device groups 20 is selectively used as a backup power supply. However, at least one of the plurality of device groups 20 may be determined in advance as a backup power supply.

The above embodiment has exemplified the case where the device group 20 as a backup power supply is electrically connected to the drive system 3 via the auxiliary machine system 4 and the DC/DC converter 13. However, the device group as the backup power supply may be electrically connected only to the auxiliary machine system 4. Even in this case, it is possible to cope with at least an abnormality in the sub-power supply 12.

The above embodiment has exemplified the case where when a backup power supply supplies power to the drive system 3 for a predetermined time, power is also supplied from the sub-power supply 12 to the drive system 3 via the auxiliary machine system 4. However, only a backup power supply may supply power to the drive system 3 for a predetermined time.

The above embodiment has exemplified the energy storage device 10 in which only one electrode assembly 700 is accommodated in the case 100. However, the energy storage device may be an energy storage device in which a plurality of electrode assemblies are accommodated in the case.

The above embodiment has exemplified the case where the positive electrode tab portion 721 and the negative electrode tab portion 722 are inverted (vertically inverted) as viewed in the X-axis direction on one end face and the other end face of the main body portion 710 of the electrode assembly 700. However, the positive electrode tab portion and the negative electrode tab portion may not be inverted. In addition, only at least one positive electrode tab portion 721 may be provided on one end face of the electrode assembly, and only at least one negative electrode tab portion 722 may be provided on the other end face of the electrode assembly. That is, the energy storage device may include only one set of positive and negative electrode terminals.

The above embodiment has exemplified the winding-type electrode assembly 700. However, the shape of the electrode assembly is not limited to the winding type and may be a stack type in which flat plates are stacked, a shape in which plates and/or separators are folded in a bellows shape (a form in which a separator is folded in a bellows shape to sandwich a rectangular plate, a form in which a plate and a separator are overlapped and then folded in a bellows shape, or the like), or the like. In any case, the stacking direction of the electrode assembly may be the Y-axis direction (first direction).

The above embodiment has exemplified the case where the first recess portions 101 are disposed at the same positions in the first side surface portion 110 and the second side surface portion 120. However, the first recess portions 101 may be respectively disposed at different positions in the first side surface portion 110 and the second side surface portion 120. The first recess portion 101 may be formed only in one of the first side surface portion 110 and the second side surface portion 120.

A mode constructed by arbitrarily combining the constituent devices included in the above embodiment and the modification examples thereof is also included in the scope of the present invention.

The present invention can be applied to a power supply system including an energy storage device such as a lithium-ion secondary battery.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the disclosure.

The invention claimed is:

1. A power supply system included in a moving body, the power supply system comprising:

a main power supply comprising a plurality of energy storage devices, a part of which forms a first device group, the main power supply connected to a drive system for moving the moving body; and a switch connected to the first device group and an auxiliary machine system of the moving body, a voltage of the auxiliary machine system being lower than that of the drive system, the auxiliary machine system and the drive system being connected via a DC/DC converter, wherein the switch is configured to close when supply of power from the main power supply to the drive system is interrupted, and the first device group is connected to the drive system via the auxiliary machine system and the DC/DC converter.

2. The power supply system according to claim 1, wherein power is supplied from the first device group to the drive system to assist traveling of the moving body.

3. The power supply system according to claim 2, further comprising a sub-power supply connected to the auxiliary machine system, wherein power from the first device group and the sub-power supply is supplied to the drive system.

* * * * *